United States Patent
Hirasawa (10) Patent No.: US 7,088,381 B2
(45) Date of Patent: Aug. 8, 2006

(54) IMAGE FORMING APPARATUS AND METHOD OF CONTROLLING THE IMAGE FORMING APPARATUS

(75) Inventor: Hideaki Hirasawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 922 days.

(21) Appl. No.: 10/106,441

(22) Filed: Mar. 27, 2002

(65) Prior Publication Data

US 2002/0141001 A1   Oct. 3, 2002

(30) Foreign Application Priority Data

Mar. 30, 2001  (JP)  ............................. 2001-100044

(51) Int. Cl.
*B41J 2/435* (2006.01)

(52) U.S. Cl. ..................................... 347/234; 347/248
(58) Field of Classification Search ................ 347/116, 347/118, 233–239, 246–255, 243, 259–261; 250/205, 208.1

See application file for complete search history.

(56) References Cited

U.S. PATENT DOCUMENTS

| 5,115,256 A | * | 5/1992 | Miyagi et al. | ............... | 347/249 |
| 5,726,437 A | * | 3/1998 | Ashikaga et al. | ........... | 250/205 |
| 5,838,359 A | * | 11/1998 | Hoover | ........................ | 347/250 |
| 6,094,208 A | * | 7/2000 | Oda et al. | ..................... | 347/118 |
| 6,476,370 B1 | * | 11/2002 | Suzuki et al. | ............. | 250/208.1 |
| 6,525,751 B1 | * | 2/2003 | Hoover | ........................ | 347/116 |
| 6,714,231 B1 | * | 3/2004 | Noguchi | ...................... | 347/246 |

FOREIGN PATENT DOCUMENTS

JP  10-272801  10/1998

\* cited by examiner

*Primary Examiner*—Hai Pham
(74) *Attorney, Agent, or Firm*—Fitzpatrick, Cella, Harper & Scinto

(57) ABSTRACT

A color image forming apparatus and laser pulse width adjustment method can shorten the time required for laser pulse width adjustment with low cost. In a color image forming apparatus in which a plurality of laser scanners scan and expose a plurality of photosensitive drums with laser beams pulse-width modulated according to image data, the scanner phases of the laser scanners in which no color misregistration occurs are recorded, the phases of the laser scanners are changed to a specific phase relationship for laser pulse width adjustment, laser pulse width adjustment is executed, and the phases of the laser scanners are then restored to the recorded scanner phases in which no color misregistration occurs.

8 Claims, 10 Drawing Sheets

IMAGE FORMING APPARATUS AND METHOD OF CONTROLLING THE IMAGE FORMING APPARATUS

BACKGROUND OF THE INVENTION

1. Field of the Invention

The present invention relates to a color image forming apparatus such as a color printer, color copying machine, color facsimile apparatus, or the like, which has a plurality of image forming portions using a plurality of laser scanner optical systems, drives a laser element by a pulse-width modulation signal, and draws an image by light emitted from the laser element.

2. Description of Related Art

Figure 12:
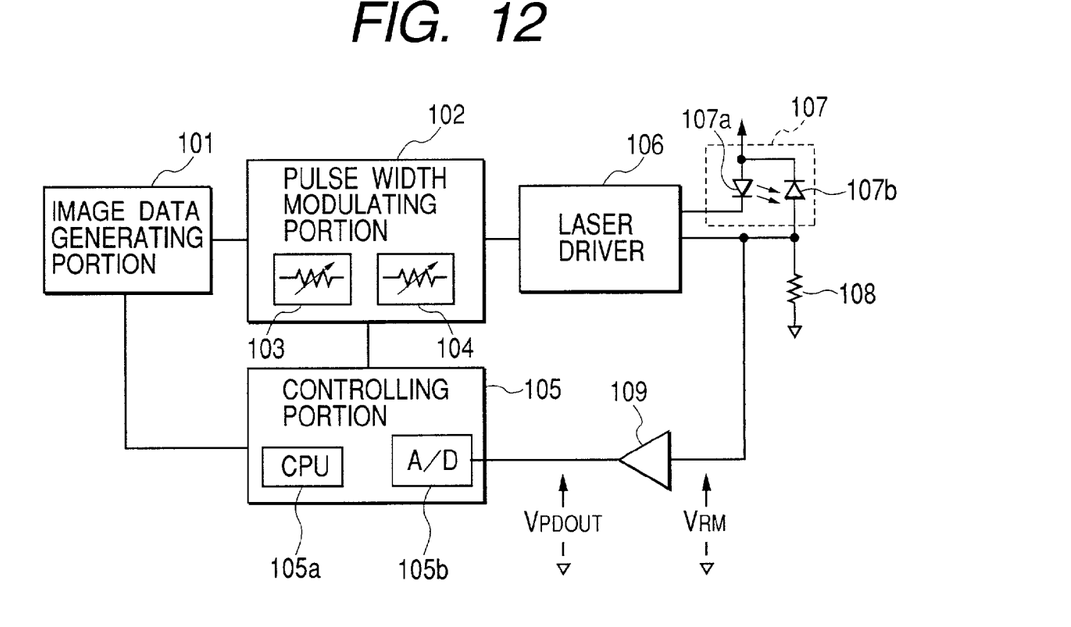
FIG. 12 is a schematic block diagram showing the arrangement of a portion associated with a laser pulse width adjustment in a conventional image forming apparatus.

FIG. 12 is a schematic block diagram showing the arrangement of a portion associated with laser pulse width adjustment of a conventional color image forming apparatus. The image forming apparatus reproduces tones of an image by pulse-width modulation.

An image data generating portion 101 draws an image on, e.g., a page memory on the basis of data supplied from an external apparatus (e.g., a host computer) to generate raster data in a print process, and to generate image data for adjustment upon adjusting the pulse width.

A pulse width modulating portion 102 pulse-width modulates 8-bit image data (density value) supplied from the image data generating portion 101 to generate a pulse-width modulation signal (pulse-width modulated signal). Note that the pulse width modulating portion 102 has a minimum pulse width setting portion 103 for setting a minimum pulse width of the pulse-width modulation signal generated by the pulse width modulating portion 102, and a maximum pulse width setting portion 104 for setting a maximum pulse width of the pulse-width modulation signal.

A laser driver 106 drives a laser diode 107a of a light-emitting portion 107 on the basis of the pulse-width modulation signal supplied from the pulse width modulating portion 102, thereby forming an electrostatic latent image on a photosensitive drum (not shown). Note that the light-emitting portion 107 has a photodiode 107b used to detect the light amount of a beam emitted by the laser diode 107a as an electrical signal. A current generated by the photodiode 107b increases nearly in proportion to an increase in light amount of light emitted by the laser diode 107a. Since the photodiode 107b has a low response speed, when the laser diode 107a repeats emission and putting out of light on the basis of the pulse-width modulation signal, the photodiode 107b generates a current according to the ratio between the light emitting period of time and the light putting out period of time. That is, the light emitting period of time increases with increasing value of image data, and a current generated by the photodiode 107b increases. Conversely, the light emitting period of time decreases with decreasing value of image data, and a current generated by the photodiode 107b decreases.

The current generated by the photodiode 107b is converted by a resistor 108 into a voltage value, which is buffered and amplified by an OP amplifier 109. The amplified value is then supplied to a controlling portion 105. The controlling portion 105 has a CPU 105a and an A/D converter 105b. The A/D converter 105b converts an analog signal (light amount detection signal) input from the OP amplifier 109 into a digital signal. Based on that digital signal, the CPU 105a adjusts the setting values of the minimum and maximum pulse width setting portions 103 and 104 so that the light amount of a beam emitted by the laser diode 107a matches a target value.

Figure 13:
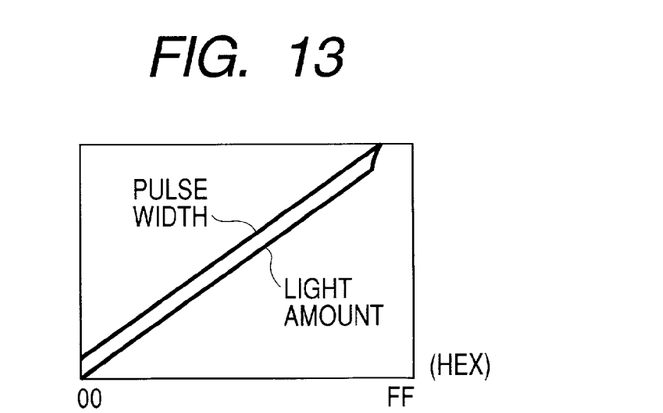
FIG. 13 is a graph showing the relationship between the pulse width of a drive signal (pulse-width modulation signal) of a laser and the light amount of a beam emitted by the laser.

FIG. 13 shows the relationship between the pulse width of a drive signal (pulse-width modulation signal) of the laser diode 107a, and the light amount of a beam emitted by the laser diode 107a. As the characteristics of the laser diode, the pulse width of a beam emitted by the laser diode becomes smaller than that of the drive signal. This is because laser oscillation occurs when the quantity of carriers inside the laser diode has exceeded a predetermined value due to a current supplied to the laser diode, and a certain time period is required until the quantity of carriers inside the laser diode exceeds the predetermined value. Such delay of laser emission is called an emission delay of laser, and is a cause of the pulse width reduction of the laser beam.

In order to obtain an emission waveform with an appropriate pulse width, the pulse width of the drive signal of the laser diode 107a must be set to be larger than that of a desired emission waveform. This adjustment is called pulse width adjustment. For this reason, when the laser diode 107a is driven based on 8-bit image data (i.e., 00(hex) to FF(hex)), the pulse width output from the pulse width modulating portion 102 is saturated at a value smaller than FF(hex). On the other hand, the light amount of light emitted by the laser diode 107a increases abruptly and is saturated while the pulse of the pulse-width modulation signal reaches saturation.

In the aforementioned arrangement example, a method of inputting image data 00 (hex), and adjusting the setting value of the minimum pulse width setting portion 103 based on the light amount detection value corresponding to that data is available. However, in this case, since the minimum pulse width is adjusted by detecting a very small light amount, it is difficult to stably detect a light amount, and it is also difficult to appropriately adjust the minimum pulse width. In the above arrangement example, since the light amount has already been saturated in image data less than FF (hex), linearity of the light amount is impaired. On the other hand, a method of inputting image data FF (hex), and adjusting the setting value of the maximum pulse width setting portion 104 based on the light amount detection value corresponding to that data is available. However, in this case, since the light amount has already been saturated in image data less than FF (hex), linearity of the light amount is impaired.

To solve this problem, Japanese Patent Application Laid-Open No. 10-272801 proposed a method of pulse-width modulating, for example, image data 10(hex) near the minimum value 00(hex) of the image data to drive a light-emitting element, adjusting the minimum pulse width based on the light amount, pulse-width modulating, for example, image data F0(hex) near the maximum value FF(hex) of the image data to drive the light-emitting element, and adjusting the maximum pulse width based on the light amount.

In an electrophotographic color image forming apparatus, various methods of sequentially transferring different color images onto a recording medium retained on a conveying belt or onto an intermediate transfer belt by providing a plurality of image forming portions to attain a high-speed process have been proposed.

However, in the case of the conventional arrangement mentioned above, the following problem is posed. When an image forming apparatus has a plurality of image forming portions (e.g., four image forming portions), and has only one A/D converter for detecting the light amount, analog signals (light amount detection signals) of respective colors must be input to the A/D converter while switching them using a multiplexer. For this reason, light amount detection requires a time corresponding to the number of image forming portions, resulting in that it is time-consuming to adjust the laser pulse width.

On the other hand, when the image forming apparatus has A/D converters in correspondence with the number of image forming portions, the time required to detect the light amounts is the same as that of an image forming apparatus having only one image forming portion. However, the cost increases due to a plurality of A/D converters.

SUMMARY OF THE INVENTION

The present invention has been made in consideration of the above situation, and has as its object to provide a color image forming apparatus which can shorten the time required to adjust the laser pulse width with low cost.

It is an object of the present invention to provide an image forming apparatus comprising:

a plurality of emitting means for emitting light beams;

a plurality of scanning means for respectively scanning the light beams emitted by the plurality of emitting means;

first controlling means for controlling phases of the plurality of scanning means to have a specific phase relationship in an image forming mode; and second controlling means for controlling the plurality of scanning means in an adjustment mode so that the phases of the plurality of scanning means have a specific phase relationship different from the specific phase relationship in the image forming mode.

It is another object of the present invention to provide an image forming apparatus comprising:

a plurality of emitting means for emitting light beams;

a plurality of scanning means for respectively scanning the light beams emitted by the plurality of emitting means;

modulating means for modulating the light beams in accordance with an image signal;

detecting means for detecting light amounts of the light beams; and single A/D converting means for sequentially converting analog data indicating the light amounts of the light beams detected by the detecting means into digital data.

It is still another object of the present invention to provide a method of controlling an image forming apparatus, which comprises a plurality of image forming portions for scanning light beams by scanning means, the method comprising:

the first step of controlling the plurality of scanning means so that phases of the plurality of scanning means have a specific phase relationship;

the step of adjusting an image forming condition of the image forming apparatus in an adjustment mode;

the second step of controlling the plurality of scanning means so that the phases of the plurality of scanning means have a specific phase relationship different from the specific phase relationship in the first step; and the step of forming an image in an image forming mode.

It is still another object of the present invention to provide a method of controlling an image forming apparatus, which comprises a plurality of image forming portions for scanning light beams by scanning means, the method comprising:

the step of modulating the light beams in accordance with an image signal;

the step of detecting light amounts of the light beams; and the step of sequentially converting analog data indicating the detected light amounts of the light beams into digital data using a single A/D converter.

Other objects, arrangements, and effects of the present invention will become apparent from the following detailed description taken in conjunction with the accompanying drawings.

DETAILED DESCRIPTION OF THE PREFERRED EMBODIMENTS

Preferred embodiments of the present invention will be described in detail hereinafter by way of embodiments of a color image forming apparatus. Note that the present invention is not limited to the form of an apparatus but may be implemented in the form of a method using the descriptions of embodiments.

First Embodiment

In the first embodiment, an arrangement which can complete laser light amount detection of respective image forming portions in a one-line period (1-BD period) in a color image forming apparatus having four image forming portions will be explained.

Figure 1:
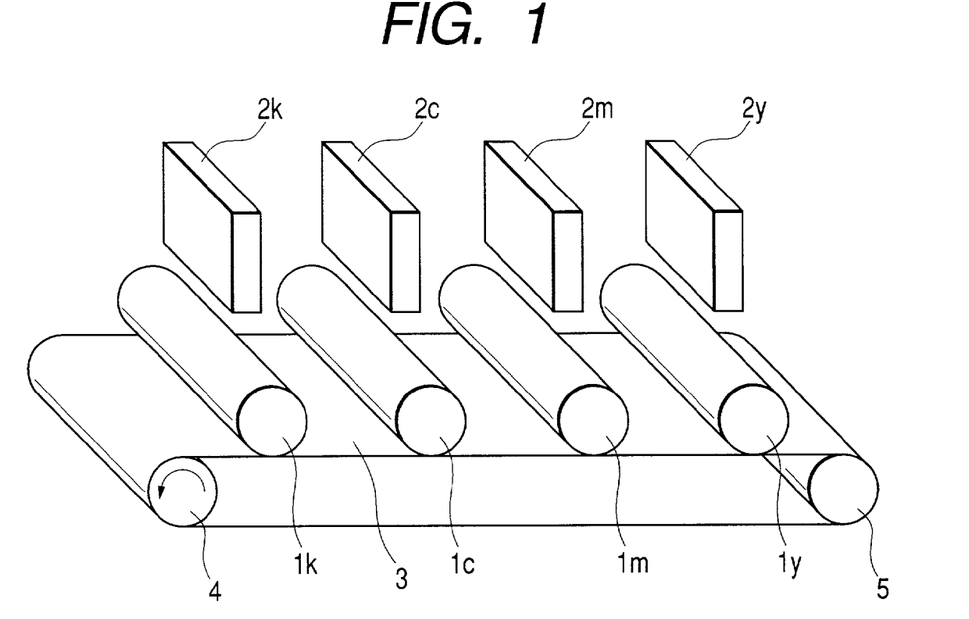
FIG. 1 is an explanatory view for explaining the overall arrangement of a color image forming apparatus according to the first embodiment of the present invention.

FIG. 1 is a view for explaining the overall arrangement of a "color image forming apparatus" according to the first embodiment. The embodiment is a color image forming apparatus having image forming portions of four colors, i.e., yellow (Y), magenta (M), cyan (C), and black (K). Referring to FIG. 1, photosensitive drums 1 (suffices k/c/m/y of reference numerals indicate components for K/C/M/Y) are used to form electrostatic latent images. Laser scanners 2 form electrostatic latent images on the photosensitive drums 1 by exposure in accordance with an image signal. An endless conveying belt 3 conveys a sheet to the image forming portions of respective colors sequentially, and also serves as a transfer belt. A drive roller 4 is driven by a motor (not shown) via a drive means including gears and the like so as to drive the conveying belt 3. A driven roller 5 is rotated by the movement of the conveying belt 3, and gives a predetermined tension to the conveying belt 3.

The operation of the embodiment will be explained below. When data to be printed is sent from, e.g., a host computer to a printer, and the printer is ready to print upon completion of image formation according to a formula of the printer, a sheet is fed from a sheet cassette, and reaches the conveying belt 3, which conveys the sheet to the image forming portions of respective colors in turn. In synchronism with the sheet convey timing of the conveying belt 3, an image signal of each color is supplied to the corresponding laser scanner 2 to form an electrostatic latent image on the corresponding photosensitive drum 1. The latent image is developed with toner by a developing device (not shown) to form a toner image, which is transferred onto the sheet by a transfer portion (not shown). In FIG. 1, images are formed in turn in the order of Y, M, C, and K. After that, the sheet is separated from the conveying belt, and the toner images are fixed on the sheet by a fixing device (not shown). The sheet is then delivered outside the apparatus.

Figure 2:
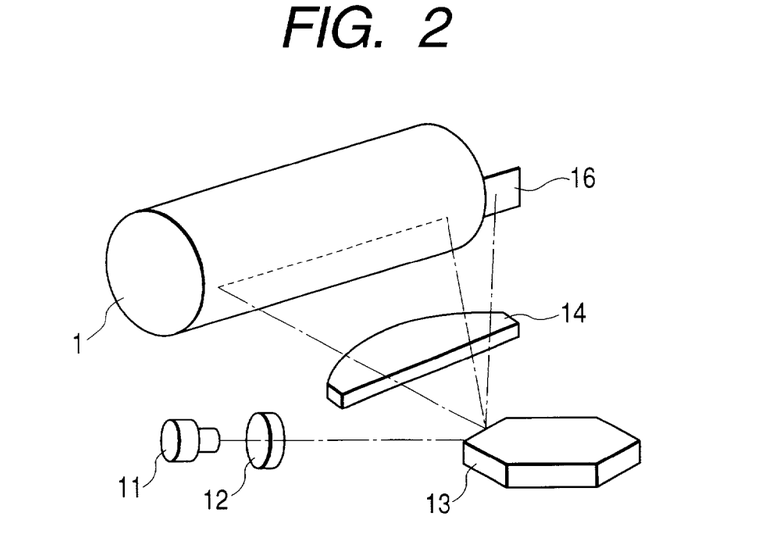
FIG. 2 is a schematic perspective view of a laser scanner optical system used in the first embodiment.

The scanner optical system of each image forming portion will be explained below. FIG. 2 is a schematic perspective view of the scanner optical system. A laser beam emitted by a laser beam source 11 is collimated by a collimator lens 12, and is then scanned by a polygonal mirror 13. The scanning speed of the scanned beam is corrected by an f-? lens 14, and the beam finally forms a latent image corresponding to an image signal on the photosensitive drum 1. An image clock is synchronized (to be referred to as "BD-synchronized" hereinafter) with a horizontal sync signal (not shown; to be referred to as a BD signal hereinafter) output from a position detection sensor 16 (to be referred to as a BD sensor hereinafter) for detecting the image signal write timing on the photosensitive drum 1. After the image clock is BD-synchronized, it is delayed for a predetermined period of time, thus starting an image signal writing process.

Since this arrangement includes a plurality of laser scanner optical systems, positional deviations (color misregister) in the conveying direction may occur in an image due to positional deviations of the respective image forming portions in the conveying direction. Correction for each line can be made by an image process. Correction less than one line is attained by controlling the rotation phase of a scanner motor.

Figure 3:
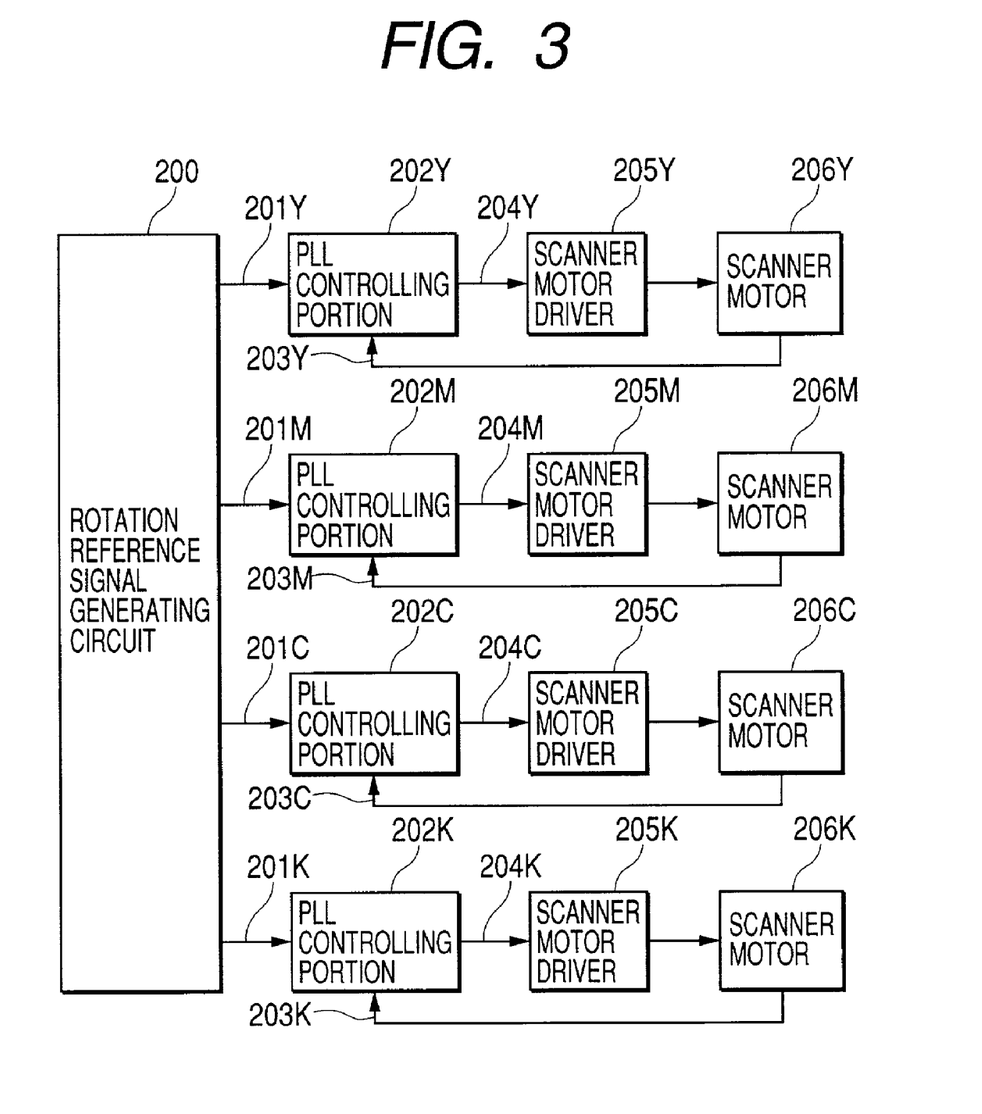
FIG. 3 is a block diagram for explaining a method of preventing color misregister or misregistration less than one line in the conveying direction.

FIG. 3 is a block diagram for explaining the method of preventing color misregister less than one line in the conveying direction. A rotation reference signal generation circuit 200 generates rotation reference signals 201Y, 201M, 201C, and 201K independent for respective colors Y, M, C, and K in accordance with a measurement result from a color misregister measurement means (not shown).

The rotation reference signals 201Y, 201M, 201C, and 201K have equal cycle periods, and their phases are controlled to have a specific relationship so as to prevent color misregister less than one line upon image formation.

PLL controlling portions 202Y, 202M, 202C, and 202K independent for respective colors yellow, magenta, cyan, and black respectively compare the phases of the rotation reference signals 201Y, 201M, 201C, and 201K with those of detect results (BD signals) 203Y, 203M, 203C, and 203K of motor rotational position detecting means, and controls to remove their phase differences. Note that the motor rotational position detecting means are the aforementioned BD sensors, and BD signals as their detection results are also used to detect the image signal write timings on the corresponding photosensitive drums.

Outputs 204Y, 204M, 204C, and 204K from the PLL controlling portions 202Y, 202M, 202C, and 202K are input to motor drivers 205Y, 205M, 205C, and 205K to accelerate/decelerate motors 206Y, 206M, 206C, and 206K.

According to the aforementioned arrangement, the phase relationship among the rotation reference signals 201Y, 201M, 201C, and 201K is determined to remove color misregister less than one line in the conveying direction, and the scanner motors are controlled based on the phase relationship, thus removing color misregister less than one line in the conveying direction. The phases of the rotation reference signals 201Y, 201M, 201C, and 201K can be determined using a color misregister detecting sensor (not shown) or based on a user's instruction. Note that color misregister not less than one line in the conveying direction can be removed by controlling the image write timing for each line.

The operation of a pulse width modulating portion will be explained below.

Figure 4:
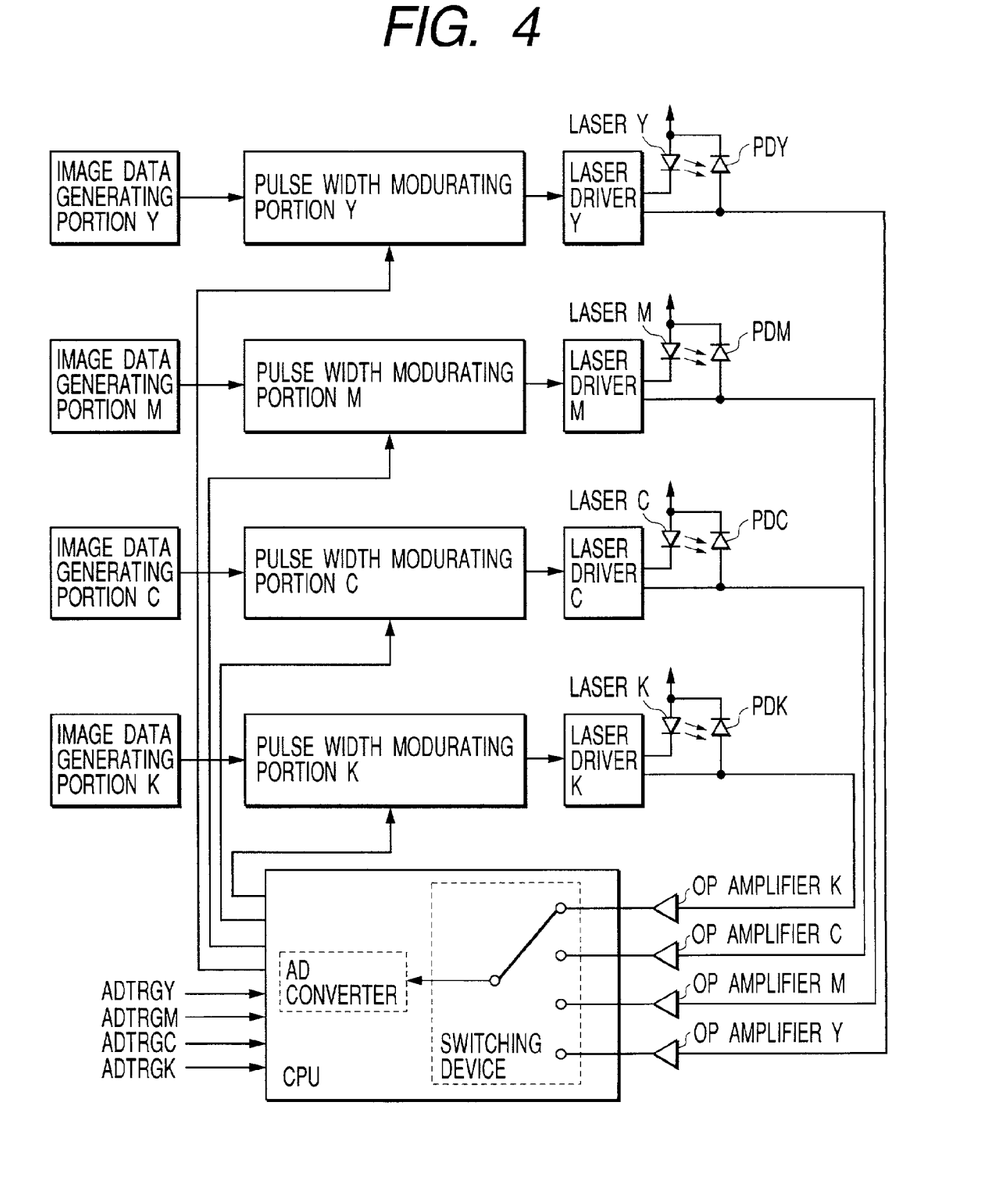
FIG. 4 is a schematic block diagram showing the arrangement of a laser pulse width adjusting portion in the first embodiment.

FIG. 4 is a schematic block diagram showing the arrangement of a laser pulse width adjusting portion. In this arrangement, since there are four image forming portions for Y, M, C, and K, four image data generating portions are arranged. In the following description, the image forming portion Y will be explained. The same applies to the remaining image forming portions X, C, and K.

An image data generating portion Y plots an image on, e.g., a page memory on the basis of data supplied from an external apparatus (e.g., a host computer) to generate raster data in a print process, and to generate image data for adjustment upon adjustment of the pulse width.

A pulse width modulating portion Y pulse-width modulates 8-bit image data (density value) supplied from the image data generating portion Y to generate a pulse-width modulation signal (pulse-width modulated signal). Note that the pulse width modulating portion Y has a minimum pulse width setting portion (not shown) for setting a minimum pulse width of the pulse-width modulation signal, and a maximum pulse width setting portion (not shown) for setting a maximum pulse width of the pulse-width modulation signal generated by the pulse width modulating portion Y.

A laser driver Y drives a laser Y on the basis of the pulse-width modulation signal supplied from the pulse width modulating portion Y, thereby forming an electrostatic latent image on a photosensitive drum (not shown). A current generated by a photodiode PDY, which detects the light amount of a beam emitted by the laser Y as an electrical signal, increases nearly in proportion to an increase in the light amount of the beam emitted by the laser Y. Since the photodiode PDY has a low operation speed, when the laser Y repeats emission and putting out of light, the photodiode PDY generates a current according to the ratio between the light emitting period of time and the light putting out period of time. That is, the light emitting period of time increases and a current generated by the photodiode PDY increases with increasing value of image data. Conversely, the light emitting period of time decreases and a current generated by the photodiode PDY decreases with decreasing value of image data.

The current generated by the photodiode PDY is converted by an internal resistor of the laser driver Y into a voltage value, which is buffered and amplified by an OP amplifier Y. The amplified value is then supplied to a CPU. Note that the CPU incorporates one A/D converter. The CPU has four A/D inputs, and a signal to be input to the A/D converter is selected by a switching device in the CPU. The A/D converter converts an analog signal (light amount detection signal) input from the OP amplifier Y into a digital signal. A/D conversion in the A/D converter starts in response to each of A/D trigger signals ADTRGY, ADTRGM, ADTRGC, and ADTRGK input to the CPU. Each A/D trigger signal is generated by generating a positive edge a predetermined period of time after the trailing edge of the BD signal of the corresponding image forming portion, and defines a timing so that A/D conversion is made at nearly the center of an image region.

Based on this digital signal, the CPU adjusts the setting values of the minimum and maximum pulse width setting portions so that the light amount of a beam emitted by the laser diode Y matches a target value.

As has been explained in the paragraphs of "Description of Related Art", since the laser diode suffers emission delay, the pulse width of the laser beam is reduced. In order to obtain an emission waveform with an appropriate pulse width, the pulse width of the drive signal of the laser diode 107a must be set to be larger than that of a desired emission waveform. This adjustment is called pulse width adjustment. For this reason, when the laser diode 107a is driven based on 8-bit image data (i.e., 00(hex) to FF(hex)), the pulse width output from the pulse width modulating portion Y is saturated at a value smaller than FF(hex). On the other hand, the amount of light emitted by the laser diode 107a increases abruptly and is saturated while the pulse of the pulse-width modulation signal reaches saturation.

In the above arrangement example, image data (e.g., 10(hex)) which is near 00(hex) and has a small light amount is input, and the setting value of the minimum pulse width setting portion 103 is adjusted based on the detection value of the light amount corresponding to that image data. Also, image data (e.g., F0(hex)) which is near FF(hex) and has a large light amount is input, and the setting value of the maximum pulse width setting portion 104 is adjusted based on the detection value of the light amount corresponding to that image data.

Figure 5:
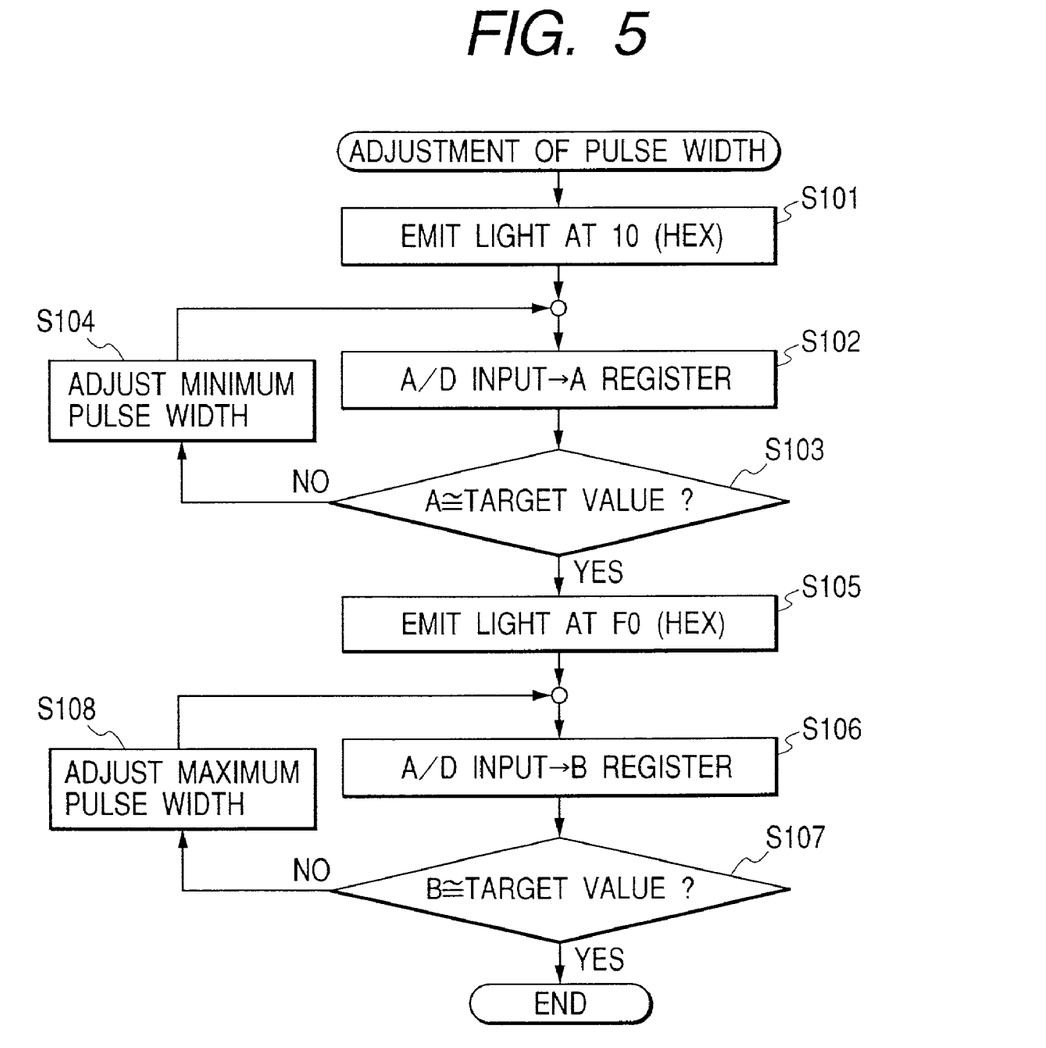
FIG. 5 is a flowchart showing the sequence of a pulse width adjustment process.

FIG. 5 is a flowchart showing the sequence of a pulse width adjustment process based on the program stored in the CPU. In the process shown in the flowchart, image data of 10(hex) and image data of F0(hex) are used as image data for pulse width adjustment. The image data 10(hex) is determined so that the photodiode can stably measure the amount of light emitted by the laser diode based on that image data. On the other hand, the image data F0(hex) is determined to fall within a non-saturation range of the amount of light emitted by the laser diode.

In step 101 (S101 in FIG. 5; the same applies to the following description), the image data generating portion supplies image data with a density value 10(hex) to the pulse width modulating portion, and the laser diode is driven by a pulse-width modulation signal corresponding to this image data.

In step 102, the amount of light emitted by the laser Y which has been driven based on the image data with the density value 10(hex) is converted into digital data by the A/D converter, and the digital data is stored in an A register in the CPU.

In step 103, a pre-set target value (a target value of the amount of light to be emitted by the laser diode in correspondence with image data with the density value 10(hex)) is compared with the value (measured light amount) stored in the A register. If the two values do not match (it is considered that they match if their difference falls within a predetermined allowable range), the setting value (minimum pulse width, i.e., the pulse width when the density value=00 (hex)) of the minimum pulse width setting portion is adjusted in step 104 so that the amount of light emitted by the laser Y matches the target value, and the flow returns to step 102.

On the other hand, if the target value matches the value (measured light amount) stored in the A register, the flow advances to step 105. In step 105, the image data generating portion supplies image data with a density value F0(hex) to the pulse width modulating portion, and the laser Y is driven by a pulse-width modulation signal corresponding to that image data.

In step 106, the amount of light emitted by the laser Y, which has been driven based on the image data with the density value F0(hex), is converted into digital data by the A/D converter, and the digital data is stored in a B register in the CPU. In step 107, a pre-set target value (a target value of the amount of light to be emitted by the laser diode Y in correspondence with image data with the density value F0(hex)) is compared with the value (measured light amount) stored in the B register.

If the two values do not match (it is considered that they match if their difference falls within a predetermined allowable range), the setting value (maximum pulse width, i.e., the pulse width when the density value=FF(hex)) of the maximum pulse width setting portion is adjusted in step 108 so that the amount of light emitted by the laser Y matches the target value, and the flow returns to step 106.

On the other hand, if the target value matches the value (measured light amount) stored in the B register, the series of processes end.

An arrangement that can complete laser pulse width adjustment within a short period of time using the scanner phase control will be explained below.

Figure 6:
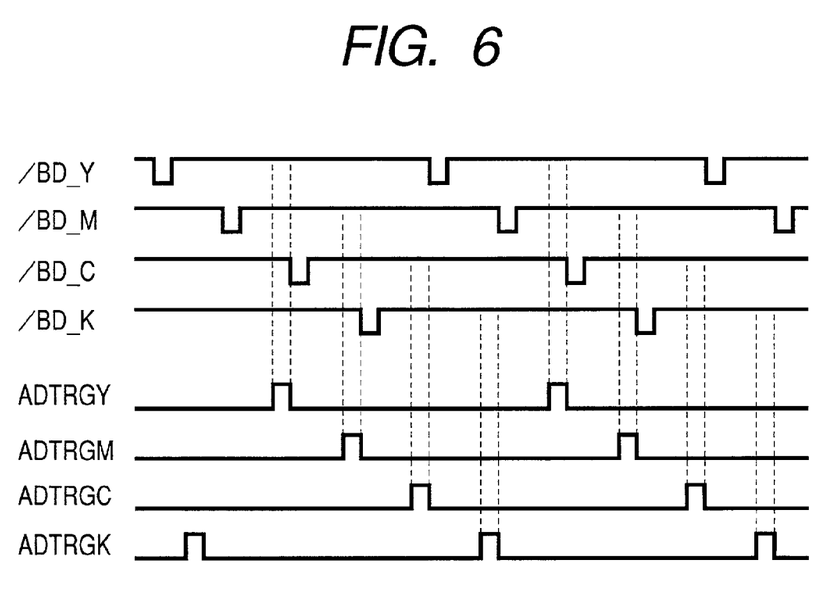
FIG. 6 is a timing chart showing the timings of BD signals in the pulse width adjustment process in the first embodiment.

FIG. 6 shows scanner phases upon laser pulse width adjustment in the first embodiment. Note that the scanner phases are indicated by BD signals. Signals /BD_Y, /BD_M, /BD_C, and /BD_K shown in FIG. 6 are BD signals of negative logic obtained by the BD sensors for Y, M, C, and K, and are controlled by the PLL controlling portions 202 in FIG. 3 to have constant cycle periods. The phases of the BD signals of the respective scanners are set to have 90° phase differences in turn in the order of Y, M, C, and K. That is, 360°÷(the number of laser scanners)=90°.

Signals ADTRGY, ADTRGM, ADTRGC, and ADTRGK shown in FIG. 6 are generated a predetermined period of time after the negative edges of the signals /BD_Y, /BD_M, /BD_C, and /BD_K, respectively, and A/D conversion is made if they are H. The predetermined period of time is determined so that A/D conversion is made at a specific timing (e.g., at the center of an image region). When the switching device selects the OP amplifier Y, ADTRGY is selected as an A/D conversion timing signal, and A/D conversion is made when ADTRGY=H. Likewise, upon selection of OP amplifiers M, C, and K, ADTRGM, ADTRGC, and ADTRGK are respectively selected as A/D conversion timing signals. Assume that the A/D converter has a speed, which is high enough to complete A/D conversion within a ¼ BD period as well as switching of the switching device.

Figure 7:
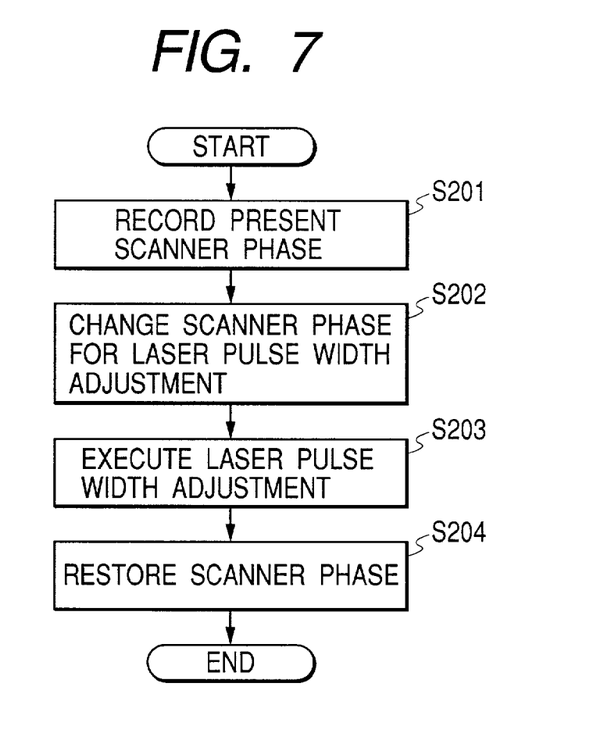
FIG. 7 is a flowchart showing the sequence of scanner phase control and laser pulse width adjustment in the first embodiment.

FIG. 7 shows the sequence of the scanner motor phase control for laser pulse width adjustment. If laser pulse width correction starts, the present phases of the scanner motors of the respective image forming portions are recorded in a memory in step 201. As described above, the scanner phases of the respective image forming portions are set to have a specific phase relationship that can prevent color misregister upon image formation, and these setting values are recorded. In step 202, the scanner phases of the respective image forming portions are adjusted to those for laser pulse width adjustment shown in FIG. 6 (so that the BD signals have 90? phase differences in turn in the order of Y, M, C, and K). In step 203, pulse width adjustment is executed. The pulse width adjustment method is as has been described above. Finally, in step 204 the scanner phase is restored to the setting values recorded in step 201.

As described above, according to the embodiment, since the light amount detection signals are fetched using one A/D converter, an increase in cost can be prevented. Also, since the light amounts of the Y, M, C, and K image forming portions can be measured within one BD period, pulse width adjustment can be done within a short period of time.

Second Embodiment

In the second embodiment, an arrangement which can complete laser amount detection of respective image forming portions within two BD periods in a color image forming apparatus which has four image forming portions each having two lasers will be explained.

An image forming apparatus using laser scanner optical systems often simultaneously scans a plurality of lines using a plurality of beams to attain high-speed image formation.

Figure 8:
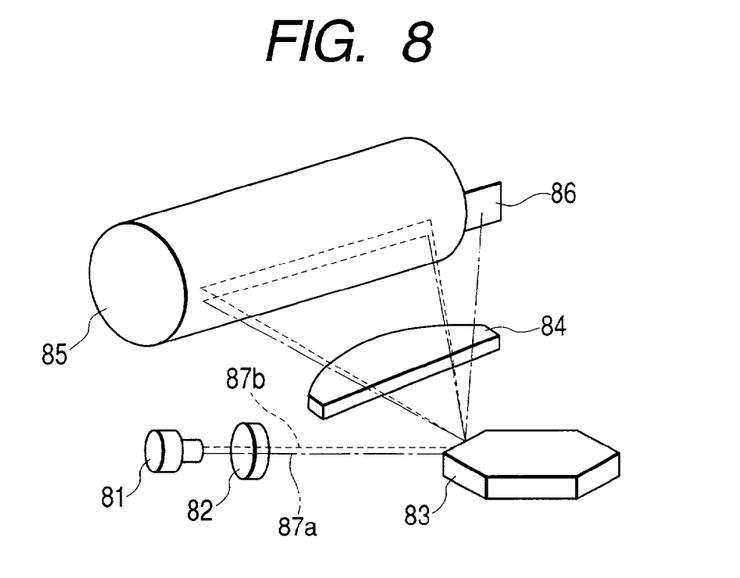
FIG. 8 is a schematic perspective view of a 2-beam scanner optical system used in the second embodiment.

FIG. 8 is a schematic perspective view of a multi-beam, in particular, a 2-beam, scanner optical system. A laser beam source 81 incorporates two lasers. A plurality of beams 87a and 87b emitted by the laser beam source 81 are collimated by a collimator lens 82, and are scanned by a polygonal mirror 83. The scanning speeds of the scanned beams 87a and 87b are corrected by an f-θ lens 84, and these beams finally form a latent image corresponding to an image signal on a photosensitive drum 85.

Figure 9:
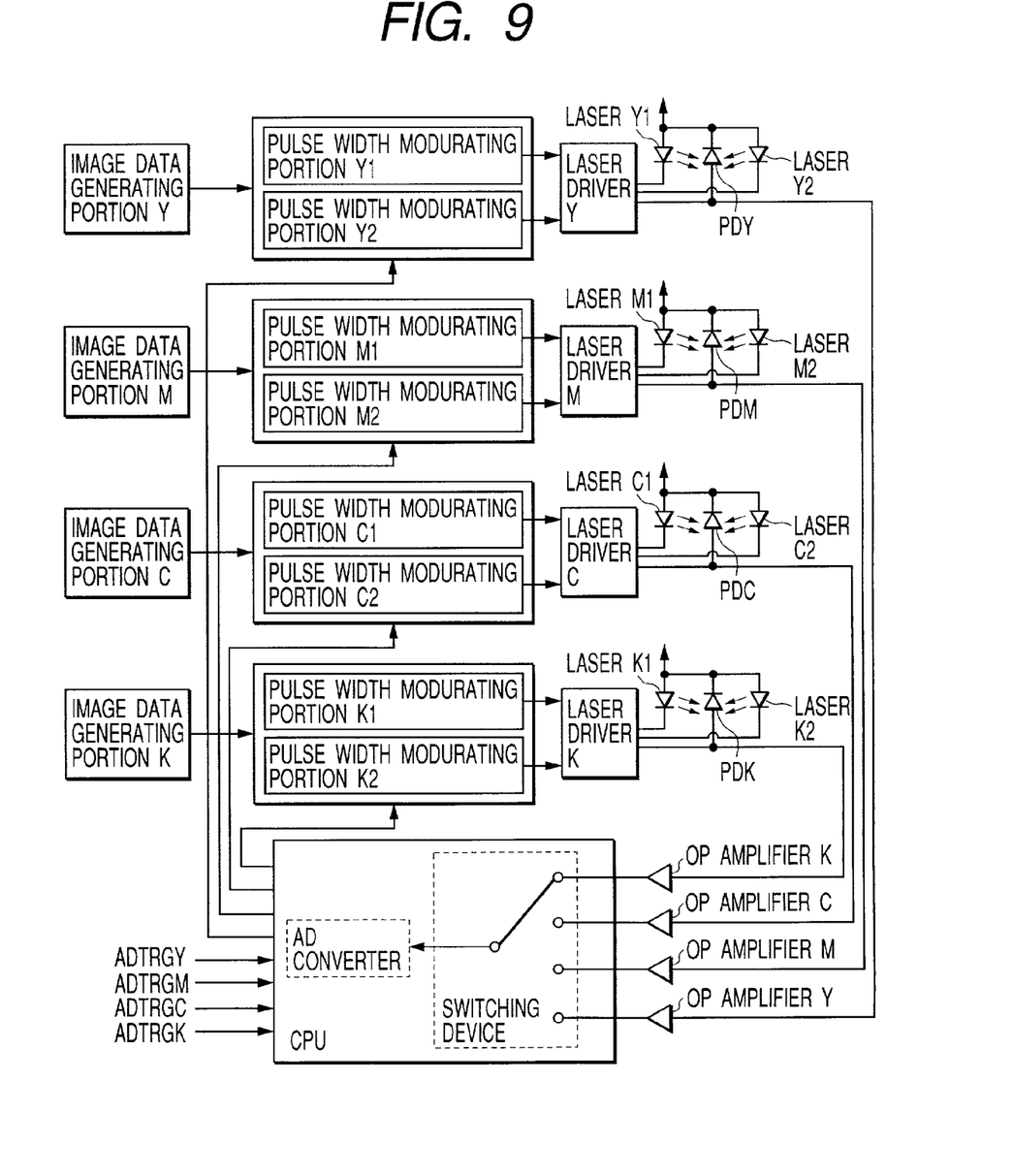
FIG. 9 is a schematic block diagram showing the arrangement of a laser pulse width adjusting portion in the second embodiment.

FIG. 9 is a schematic block diagram of a laser pulse width adjusting portion in the embodiment. The arrangement is substantially the same as that in FIG. 4, except that each image forming portion has two each pulse width modulating portions and lasers. The difference from the first embodiment will be explained below in association with an image forming portion Y. The same applies to other image forming portions.

An image data generating portion Y generates image data based on data supplied from an external apparatus in a print process, and generates image data for adjustment upon pulse width adjustment.

Pulse width modulating portions Y1 and Y2 pulse-width modulate image data (density value) supplied from the image data generating portion Y to generate pulse-width modulation signals. The pulse width modulating portion Y1 generates a pulse-width modulation signal for a laser Y1, and the pulse width modulating portion Y2 generates a pulse-width modulation signal for a laser Y2.

A laser driver Y drives the laser Y1 on the basis of the pulse-width modulation signal supplied from the pulse width modulating portion Y1, thus forming an electrostatic latent image on the photosensitive drum. Likewise, the laser driver Y drives the laser Y2 on the basis of the pulse-width modulation signal supplied from the pulse width modulating portion Y2, thus forming an electrostatic latent image on the photosensitive drum.

A photodiode PDY detects the sum of amounts of beams emitted by the lasers Y1 and Y2 as a signal, and generates a current corresponding to the sum of light amounts.

Pulse width adjustment is done in the following sequence. In order to make pulse width adjustment of the laser Y1, adjustment is done in the sequence shown in FIG. 5 in the same manner as in the first embodiment, while the laser Y2 does not emit light. In order to make pulse width adjustment of the laser Y2, adjustment is done in the sequence shown in FIG. 5 in the same manner as in the first embodiment, while the laser Y1 does not emit light. At this time, when the lasers Y1 and Y2 emit light alternately, the laser pulse width adjustment processes of the lasers Y1 and Y2 can be done in parallel.

Figure 10:
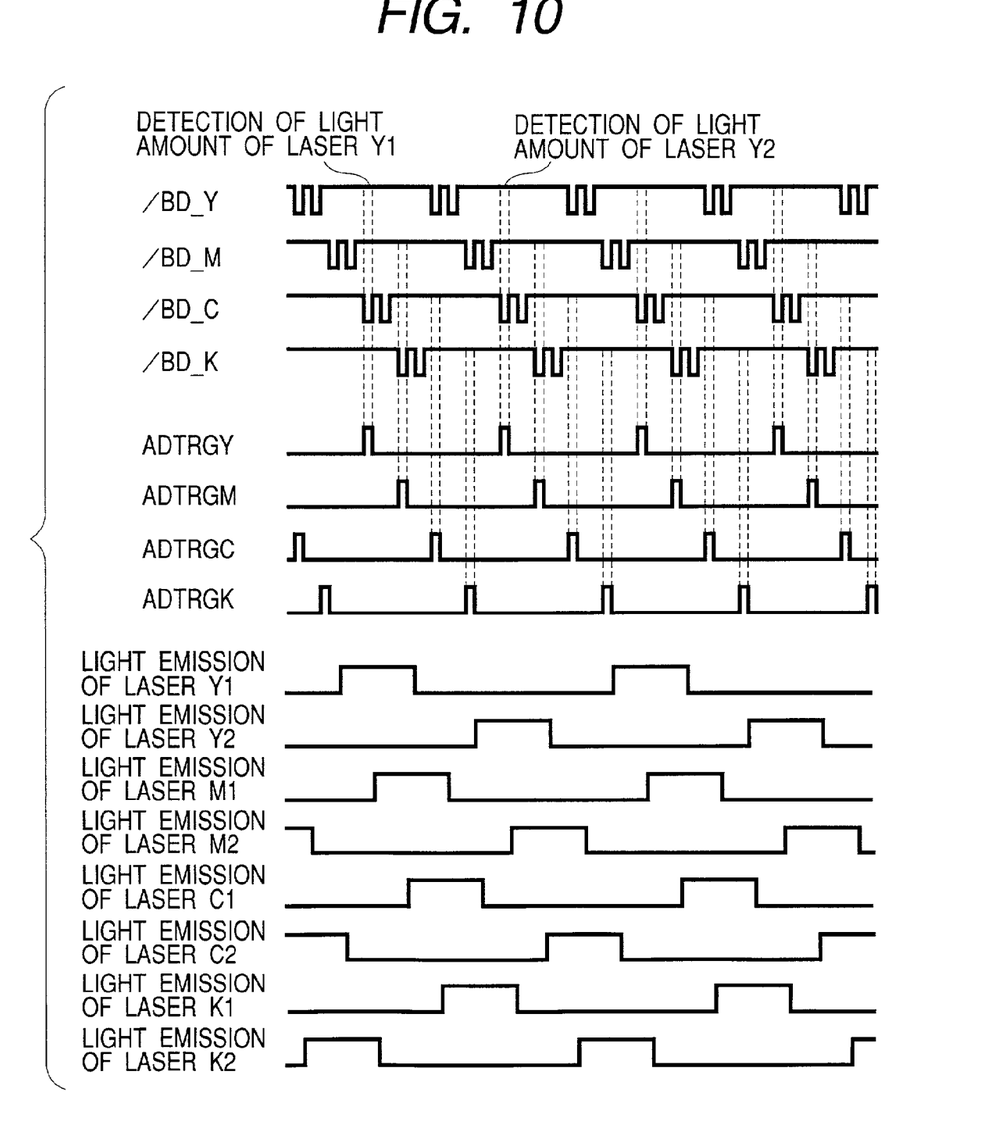
FIG. 10 is a timing chart showing the timings of BD signals in a laser pulse width adjustment of the second embodiment.

FIG. 10 shows the scanner phases upon laser pulse width adjustment in the embodiment, i.e., the phases of BD signals. Signals /BD_Y, /BD_M, /BD_C, and /BD_K shown in FIG. 10 are BD signals of negative logic obtained by BD sensors of Y, M, C, and K, and are controlled by the PLL controlling portions 202 in FIG. 3 to have constant cycle periods. Since beams emitted by the two lasers enter one BD sensor, as shown in FIG. 8, the BD signal goes active (LOW) twice per one cycle period.

Each of signals ADTRGY, ADTRGM, ADTRGC, and ADTRGK shown in FIG. 10 is generated a predetermined period of time after the first one of two negative edges of each of the signals /BD_Y, /BD_M, /BD_C, and /BD_K. The predetermined period of time is determined so that A/D conversion is made near the center of an image region. The operations of the A/D converter in response to the signals ADTRGY, ADTRGM, ADTRGC, and ADTRGK are the same as those in the first embodiment.

Signals of light emission of laser Y1, light emission of laser Y2, light emission of laser M1, light emission of laser M2, light emission of laser C1, light emission of laser C2, light emission of laser K1, and light emission of laser K2 shown in FIG. 10 respectively indicate light emission timings for laser pulse width adjustment of lasers Y1, Y2, M1, M2, C1, C2, K1, and K2. When the signal is HIGH, each laser emits light; when the signal is LOW, each does not emit light.

The scanner motor control sequence for laser pulse width adjustment is shown in FIG. 7 as in the first embodiment. Upon executing pulse width adjustment in step 203, the light amounts of the two lasers are alternately measured in each image forming portion, as described above.

The order of light amount measurements of the respective lasers will be explained below with reference to FIG. 10. In the image forming portion Y, the signal ADTRGY goes H near the center of an image region. At this time, since the laser Y1 emits light for laser pulse width adjustment, and the laser Y2 is OFF, only the light amount of the laser Y1 can be measured. After that, the light amounts of the lasers M1, C1, K1, Y2, M2, C2, and K2 are measured in turn.

As can be seen from the timings shown in FIG. 10, these light amount measurements are completed within two BD cycle periods. By repeating these light amount measurements a plurality of times, laser pulse width adjustment is done.

With the above arrangement, since the light amounts of the image forming portions Y, M, C, and K can be measured within two BD cycle periods, pulse width adjustment can be done within a short period of time in the apparatus with the 2-beam laser arrangement.

Third Embodiment

In the third embodiment, an arrangement which can complete detection of light amount of lasers of respective image forming portions within two BD cycle periods in a color image forming apparatus having four image forming portions will be explained.

In the third embodiment, the basic arrangement is the same as that in the first embodiment, but the conversion speed of the A/D converter is low and A/D conversion cannot be completed within a ¼ BD cycle period, unlike in the first embodiment.

Figure 11:
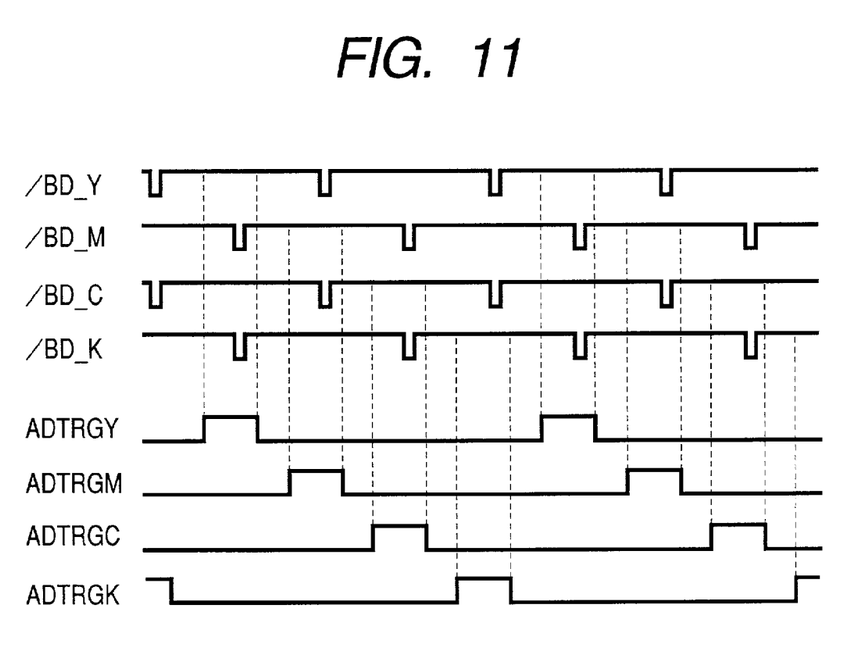
FIG. 11 is a timing chart showing the timings of BD signals in a laser pulse width adjustment of the third embodiment.

FIG. 11 shows the scanner phases upon laser pulse width adjustment in the third embodiment. Signals /BD_Y, /BD_M, /BD_C, and /BD_K shown in FIG. 11 are BD signals of negative logic obtained by BD sensors for Y, M, C, and K as in the first embodiment. The signals /BD_Y and /BD_C are in phase, and the signals /BD_M and /BD_K are in phase. The signals /BD_Y and /BD_M are out of phase by 180°.

Signals ADTRGY, ADTRGM, ADTRGC, and ADTRGK shown in FIG. 11 are generated a predetermined period of time after the negative edges of the signals /BD_Y, /BD_M, /BD_C, and /BD_K, respectively. However, unlike in the first embodiment, the signals ADTRGY, ADTRGM, ADTRGC, and ADTRGK are generated once per two negative edges of the BD signals, so that the signals ADTRGY, ADTRGM, ADTRGC, and ADTRGK are out of phase by 180° in the order named. That is, 360°÷(the number of laser scanners)×2=180°. Depending on the processing speed of the A/D converter and the like, an appropriate frequency given by 360° (the number of laser scanners)×n (where n is a natural number) can be selected.

The order of light amount measurements of the respective lasers will be explained below with reference to FIG. 11. After the signal /BD_Y goes LOW, the signal ADTRGY goes HIGH near the center of the first image region to make A/D conversion. Next, the signal ADTRGM goes HIGH after a ½ BD cycle period to make A/D conversion. After that, light amount measurements of the lasers M and K are done every ½ BD cycle periods. With the above operations, the light amounts of the lasers of the four image forming portions can be measured within two BD cycle periods. By repeating this process a plurality of times, laser pulse width adjustment can be done in the sequence shown in FIG. 7 as in the first embodiment.

In this way, the light amounts of the lasers of the Y, M, C, and K image forming portions can be measured within two BD cycle periods, and pulse width measurements can be done within a short period of time even when the A/D converter has a low conversion speed.

In the embodiments described above, an arrangement having a plurality of photosensitive drums has been explained. Also, the present invention can be practiced in the same manner as described above in a color image forming apparatus which makes multiple development on a single photosensitive drum using a plurality of laser scanner optical system.

As described above, in an image forming apparatus with a plurality of laser scanners, laser pulse width correction can be done within a short period of time using a low-cost arrangement.

Some preferred embodiments of the present invention have been explained. However, the present invention is not limited to such specific embodiments, and various modifications and applications may be made within the scope of the claims.

What is claimed is:

1. An image forming apparatus comprising:
   a plurality of light sources that emit light beams;
   a plurality of optical scanners that respectively scan the emitted light beams to form images;
   a plurality of beam detectors that detect the scanned light beams and output detection signals;
   a phase controller that controls, in an image forming mode for forming images, said plurality of optical scanners to have a first phase relationship based on the detection signals, and controls, in an adjustment mode for adjusting an image forming condition, said plurality of optical scanners to have a second phase relationship different from the first phase relationship based on the detection signals;
   a plurality of light amount detectors that detect light amounts of the light beams; and
   a single A/D converter that sequentially converts analog data representing the light amounts of the light beams detected by said light amount detectors into digital data.

2. An apparatus according to claim 1, further comprising:
   a modulator that pulse-width modulates the light beams in accordance with an image signal; and
   an adjusting unit that adjusts a modulation process condition of said modulator in the adjustment mode.

3. An apparatus according to claim 1, wherein said phase controller controls said plurality of optical scanners so that phase differences of said plurality of optical scanners are substantially equal to one another in the adjustment mode.

4. An apparatus according to claim 1, wherein each of said plurality of light sources emits a plurality of light beams, and
   each of said plurality of optical scanners simultaneously scans the plurality of light beams emitted by said light sources.

5. A method of controlling an image forming apparatus, which comprises a plurality of image forming units that scan light beams by a plurality of optical scanners, said method comprising:
   a step of detecting, with a beam detector, the scanned light beams and outputting detection signals;
   a first controlling step of controlling in an image forming mode the plurality of optical scanners based on the detection signals to have a specific phase relationship;
   a step of forming an image in the image forming mode;
   a second controlling step of controlling in an adjustment mode the plurality of optical scanners based on the detection signals to have a specific phase relationship different from the specific phase relationship in the first controlling step;
   a step of detecting light amounts of the light beams;
   a step of sequentially converting, by using a single A/D converter, analog data representing the light amounts of the light beams detected in said detecting step into digital data; and a step of adjusting an image forming condition of the image forming apparatus based on the converted digital data.

6. A method according to claim 5, further comprising:
an adjusting step of adjusting a modulation process condition of an image signal in the adjustment mode; and
a modulating step of pulse-width modulating the light beams in accordance with an image signal in accordance with the modulation process condition adjusted in the adjusting step in the image forming mode.

7. A method according to claim 5, wherein the second controlling step includes a step of controlling the plurality of optical scanners so that phase differences of the plurality of optical scanners are substantially equal to one another.

8. A method according to claim 5, wherein each light source in the image forming apparatus emits a plurality of light beams.

* * * * *

UNITED STATES PATENT AND TRADEMARK OFFICE
CERTIFICATE OF CORRECTION

PATENT NO. : 7,088,381 B2  Page 1 of 1
APPLICATION NO. : 10/106441
DATED : August 8, 2006
INVENTOR(S) : Hirasawa It is certified that error appears in the above-identified patent and that said Letters Patent is hereby corrected as shown below:

SHEET NO. 3 of 10:
Figure 4, "MODURATING" (all occurrences) should read --MODULATING--.

SHEET NO. 7 of 10:
Figure 9, "MODURATING" (all occurrences) should read --MODULATING--.

COLUMN 6:
Line 36, "portions X," should read --portions M,--.

COLUMN 9:
Line 14, "have 90?" should read --have 90°--.

COLUMN 10:
Line 18, "Yl" should read --Y1--.

Signed and Sealed this

Seventeenth Day of June, 2008

JON W. DUDAS
*Director of the United States Patent and Trademark Office*